(12) United States Patent
Seok et al.

(10) Patent No.: US 10,920,956 B1
(45) Date of Patent: Feb. 16, 2021

(54) LAMP FOR VEHICLE

(71) Applicant: SL Corporation, Daegu (KR)

(72) Inventors: Jae Hyun Seok, Gyeongsan-si (KR);
Dong Soo Shin, Gyeongsan-si (KR);
Jin Han Bae, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/896,036

(22) Filed: Jun. 8, 2020

(30) Foreign Application Priority Data

Aug. 6, 2019 (KR) .................. 10-2019-0095645

(51) Int. Cl.
| | |
|---|---|
| *F21S 43/20* | (2018.01) |
| *F21V 23/00* | (2015.01) |
| *F21S 43/237* | (2018.01) |
| *F21S 43/40* | (2018.01) |
| *F21S 43/14* | (2018.01) |
| *B60Q 1/00* | (2006.01) |
| *F21W 103/35* | (2018.01) |
| *F21Y 115/10* | (2016.01) |
| *F21Y 113/13* | (2016.01) |
| *F21W 103/20* | (2018.01) |

(52) U.S. Cl.
CPC ............ *F21S 43/26* (2018.01); *B60Q 1/0041* (2013.01); *F21S 43/14* (2018.01); *F21S 43/237* (2018.01); *F21S 43/40* (2018.01); *F21V 23/003* (2013.01); *B60Q 2400/20* (2013.01); *F21W 2103/20* (2018.01); *F21W 2103/35* (2018.01); *F21Y 2113/13* (2016.08); *F21Y 2115/10* (2016.08)

(58) Field of Classification Search
CPC .. B60Q 1/0041; B60Q 1/2696; B60Q 1/0011; B60Q 2400/20
USPC .................................................. 362/459–549
See application file for complete search history.

(56) References Cited

U.S. PATENT DOCUMENTS

| | | | | |
|---|---|---|---|---|
| 2006/0044825 | A1* | 3/2006 | Sa ........................ | B60Q 1/0058 362/600 |
| 2013/0329444 | A1* | 12/2013 | Oh ........................ | F21S 43/195 362/543 |
| 2015/0354771 | A1* | 12/2015 | Huang .................... | F21S 43/14 362/520 |
| 2017/0234501 | A1* | 8/2017 | Hanami ............... | G02B 6/0036 362/511 |

* cited by examiner

*Primary Examiner* — William J Carter
(74) *Attorney, Agent, or Firm* — Nelson Mullins Riley & Scarborough LLP; Kongsik Kim, Esq.

(57) ABSTRACT

A lamp for a vehicle includes a light source unit including at least one first light source for generating first light and at least one second light source for generating second light formed in a color different from a color of the first light, a light guide unit for guiding the first light and the second light incident through an incident member thereof, a transmission lens disposed between the first light source and the incident member of the light guide unit, through which the first light is incident and emitted, and an outer lens through which at least a portion of the first light and the second light guided by the light guide unit is transmitted. In particular, the color of the first light is changed by the transmission lens and is subsequently changed by the outer lens.

12 Claims, 7 Drawing Sheets

LAMP FOR VEHICLE

CROSS-REFERENCE TO RELATED APPLICATION

This application claims priority from Korean Patent Application No. 10-2019-0095645 filed on Aug. 6, 2019, the contents of which are herein incorporated by reference in their entirety.

BACKGROUND

1. Technical Field

The present disclosure relates to a lamp for a vehicle, and more particularly, to a lamp for a vehicle capable of irradiating a plurality of colors through a light guide unit.

2. Description of the Related Art

Generally, a light guide unit provides a path for scattering and diffusing light from a light source. In the light guide unit, a light emitting diode (LED) light source, which is a point light source that outputs light having straightness, is usually arranged on a side surface. The light incident from the LED light source is converted to surface light through the light guide unit and then emitted.

Accordingly, the light guide unit may provide an indirect lighting effect without directly exposing the light source to be visible. The indirect lighting effect of the light guide unit improves aesthetics. As such, in accordance with the recent trend that emphasizes not only the illumination and signal functions of vehicle lamps but also aesthetic effects, the light guide unit is being applied to a lamp for a vehicle. However, in the related art, a single LED light source is used for the light guide unit, and it is arranged at one end of the light guide unit to irradiate light to the light guide unit.

The light irradiated to the light guide unit is totally reflected inside the light guide unit and transmitted to the other end, and a portion of the light is projected to the outside of the light guide unit. By the light projected to the outside through the light guide unit, it is recognized from the outside as if the light guide unit emits light from its surface.

SUMMARY

Aspects of the present disclosure provide a lamp for a vehicle capable of irradiating light with a plurality of colors through a light guide unit. However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of an exemplary embodiment, a lamp for a vehicle may include a light source unit including at least one first light source for generating first light and at least one second light source for generating second light formed in a color different from a color of the first light; a light guide unit for guiding the first light and the second light incident through an incident member thereof; a transmission lens disposed between the first light source and the incident member of the light guide unit, through which the first light is incident and emitted; and an outer lens through which at least a portion of the first light and the second light guided by the light guide unit is transmitted. The transmission lens may be formed in a first color, and the outer lens may be formed in a second color. In particular, the color of the first light may be changed by the transmission lens when the first light is incident on the incident member of the light guide unit, and may be subsequently changed by the outer lens when the first light is emitted through the outer lens.

The light guide unit may further comprise a reflective optic member formed on at least a portion of a rear surface of the light guide unit, which may reflect at least a portion of the incident first light and second light; and an emission member arranged opposite to the rear surface, which may emit light reflected from the reflective optic member.

The incident member may comprise a first incident surface on which the first light is incident and a second incident surface on which the second light is incident. The second incident surface may be formed to protrude farther than the first incident surface in a direction toward the light source unit. An incident surface of the transmission lens may be disposed on a same plane as the second incident surface of the light guide unit. The transmission lens may be formed larger than the first incident surface, and the transmission lens may include a hole. The hole of the transmission lens may correspond to a circumference of the first incident surface of the light guide unit.

In particular, the first color of the transmission lens may be green, and/or the second color of the outer lens may be pink.

The vehicle may further comprise a control unit for controlling the first light source and the second light source. The control unit may be configured to turn off the second light source when the first light source is turned on, and to turn off the first light source when the second light source is turned on.

The first light may perform a turn signal function as it transmits through the outer lens, and the second light may perform at least one of a tail lamp function or a brake lamp function as it transmits through the outer lens. The color of the first light transmitted through the outer lens may be a shade of yellow, and the color of the second light transmitted through the outer lens may be a shade of red.

Further, the vehicle may also comprise an inner lens disposed between the light guide unit and the outer lens, and the inner lens may include a plurality of optics that diffuse the first light and the second light emitted from the light guide unit in a direction of the outer lens. The first light source may include a white LED, and the second light source may include a red LED.

According to a light guide unit of the present disclosure and a lamp for a vehicle including the same, one or more of the following benefits may be obtained. As the light transmits through the light guide unit and a transmission lens formed in a first color, the lamp may perform a signal function and a tail lamp function. As first light and second light are diffused through an inner lens and transmitted to an outer lens, a uniform lighting image may be formed.

The effects of the present disclosure are not limited to the above-described effects, and other effects which are not described herein will become apparent to those skilled in the art from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
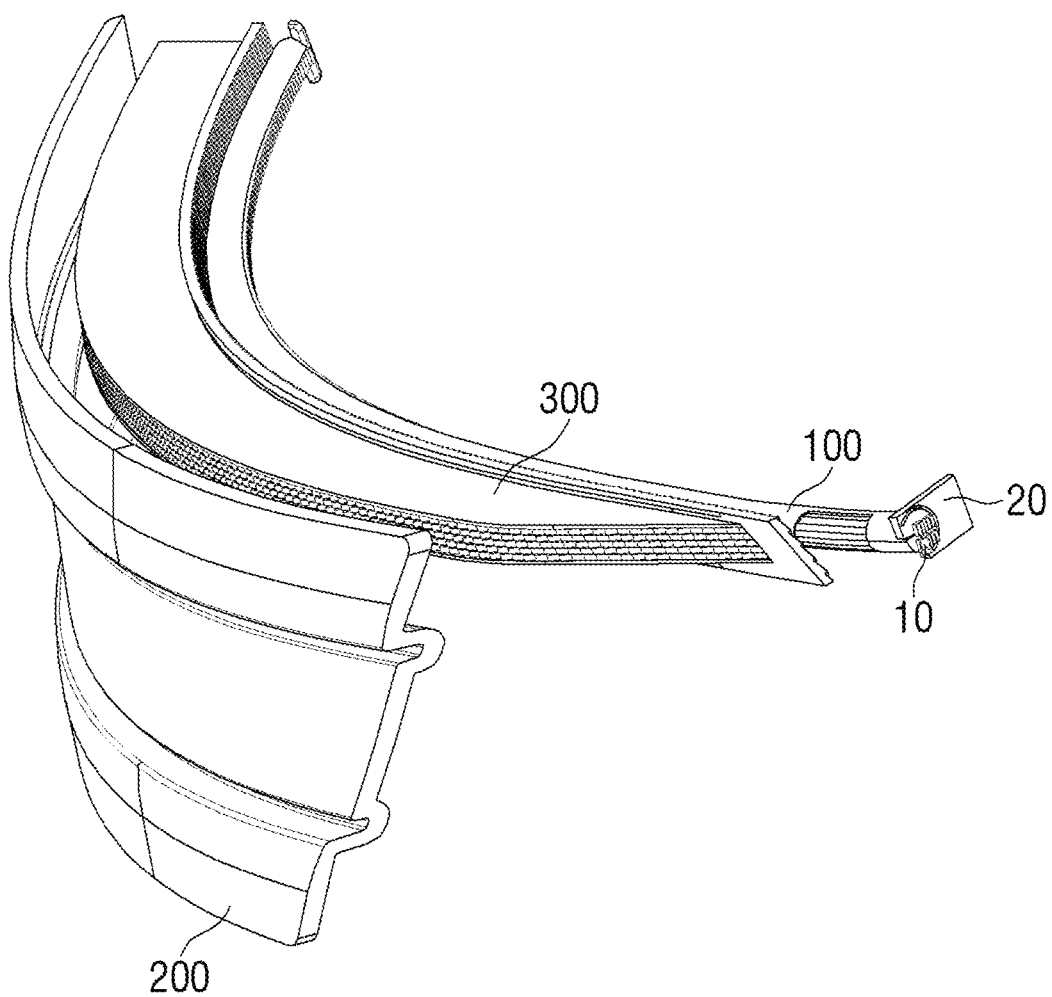
FIGS. 1 to 3 show a lamp for a vehicle according to an exemplary embodiment of the present disclosure.

Advantages and features of the disclosure and methods to achieve them will become apparent from the descriptions of exemplary embodiments herein below with reference to the accompanying drawings. However, the inventive concept is not limited to exemplary embodiments disclosed herein but may be implemented in various ways. The exemplary embodiments are provided for making the disclosure of the inventive concept thorough and for fully conveying the scope of the inventive concept to those skilled in the art. It is to be noted that the scope of the disclosure is defined only by the claims. Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Terms used herein are for illustrating the exemplary embodiments rather than limiting the present disclosure. As used herein, the singular forms are intended to include plural forms as well, unless the context clearly indicates otherwise. Throughout this specification, the word "comprise" and variations such as "comprises" or "comprising," will be understood to imply the inclusion of stated elements but not the exclusion of any other elements.

Hereinafter, exemplary embodiments of the present disclosure will be described in detail with reference to the accompanying drawings.

Figure 2:
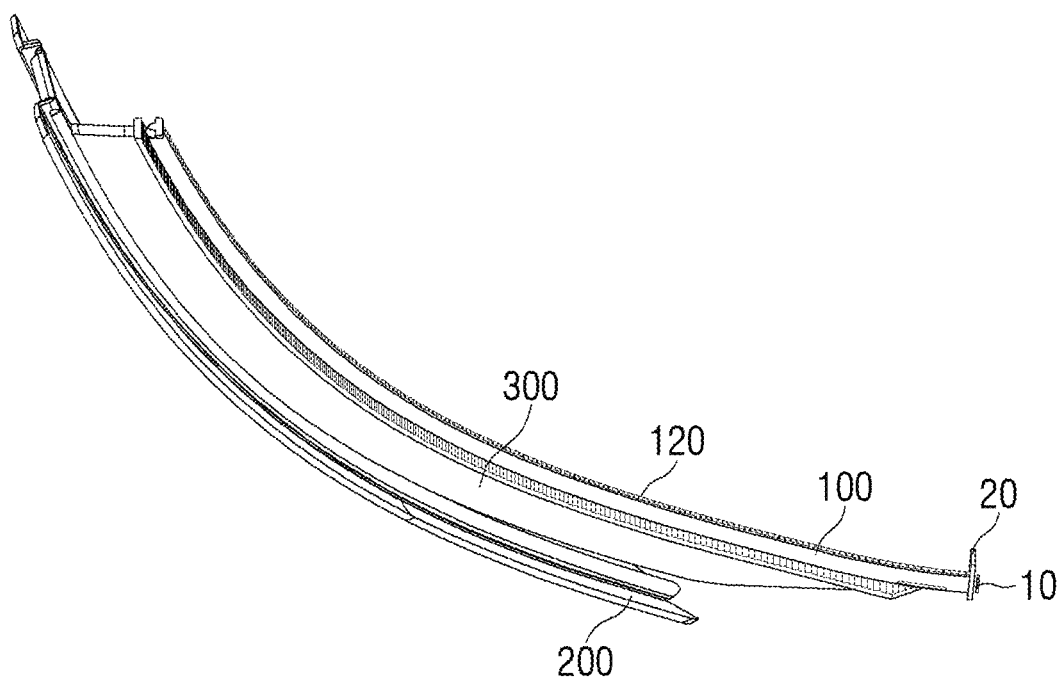
Figure 3:
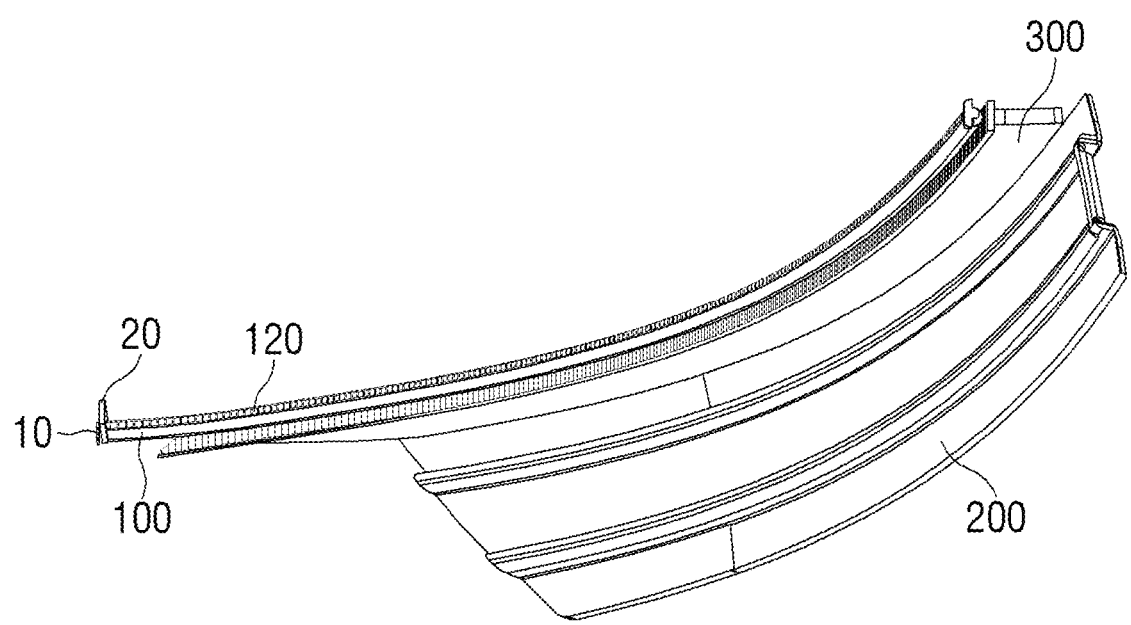
Figure 4:
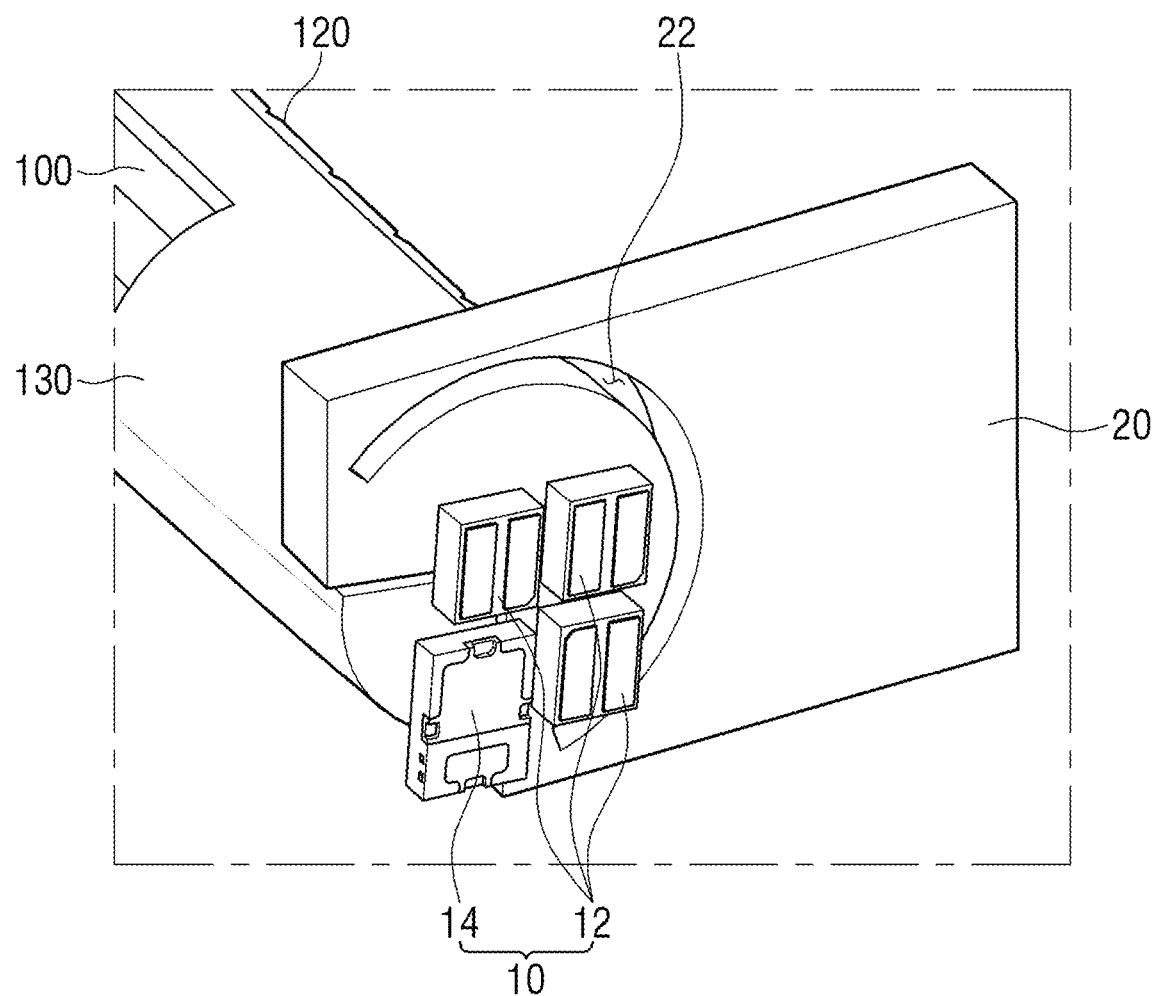
FIG. 4 shows a first light source and a second light source according to the exemplary embodiment of the present disclosure.
Figure 5:
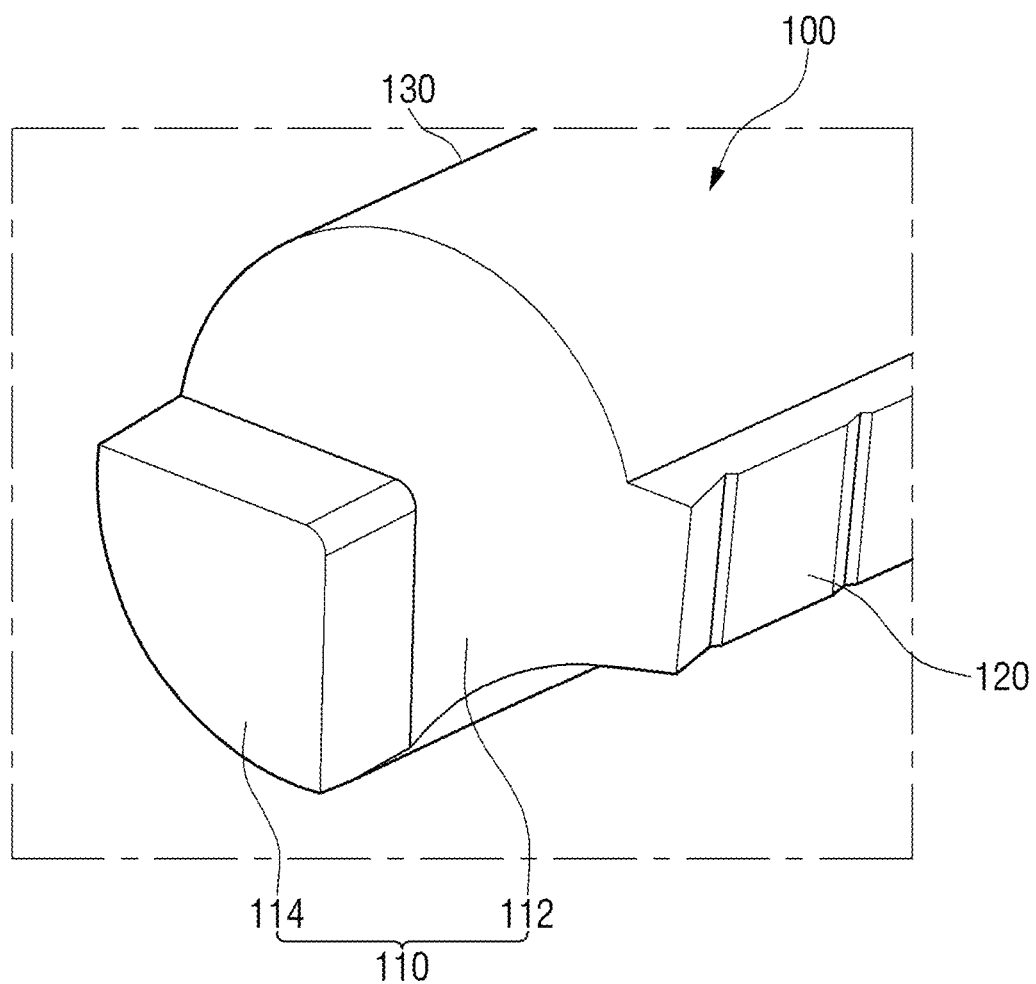
FIG. 5 shows a portion of a light guide unit of the lamp for the vehicle according to the exemplary embodiment of the present disclosure.
Figure 6:
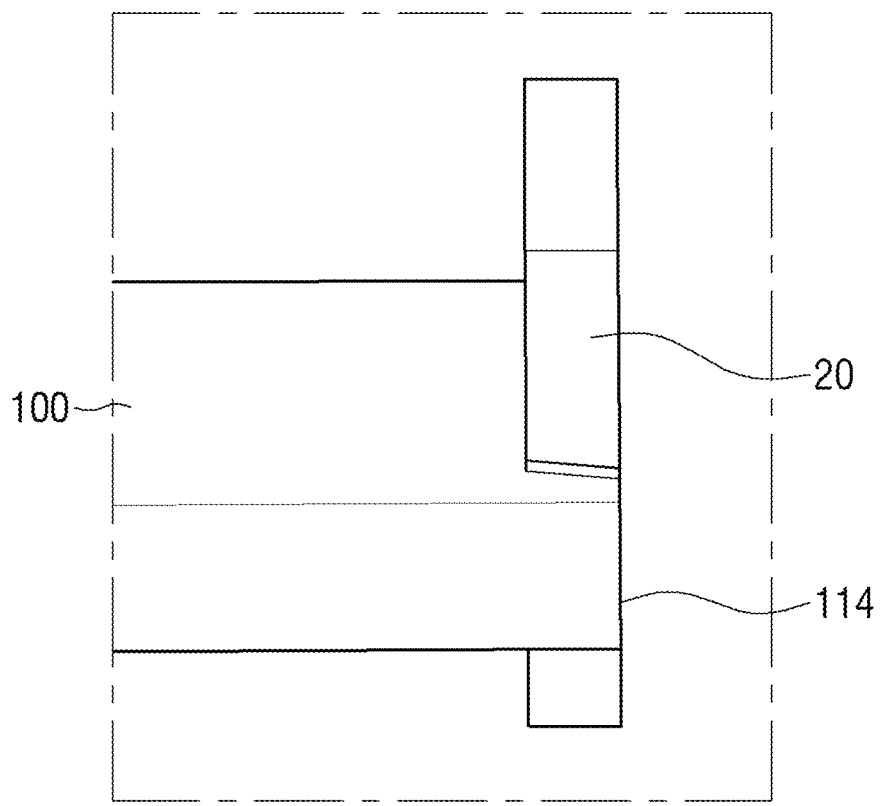
FIG. 6 shows a transmission lens of the lamp for the vehicle according to the exemplary embodiment of the present disclosure.
Figure 7:
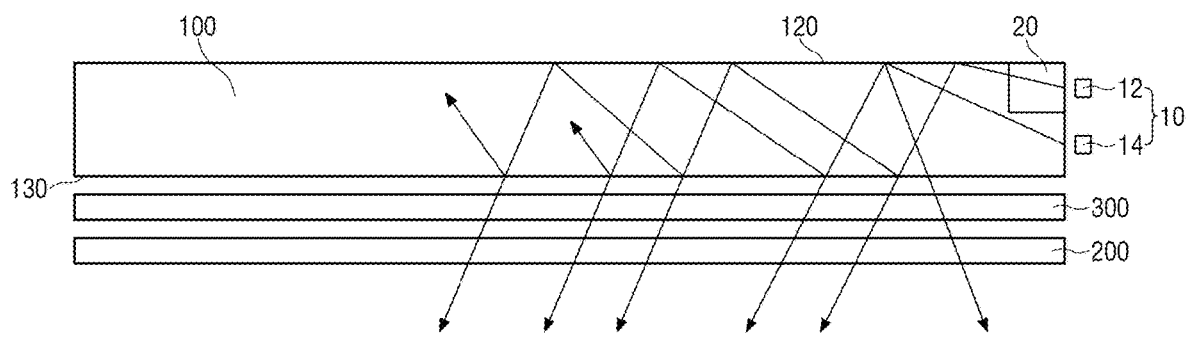
FIG. 7 schematically shows an optical path of the lamp for the vehicle according to the exemplary embodiment of the present disclosure.

FIGS. 1 to 3 show a lamp for a vehicle according to an exemplary embodiment of the present disclosure. FIG. 4 shows a first light source and a second light source according to the exemplary embodiment of the present disclosure. FIG. 5 shows a portion of a light guide unit of the lamp for the vehicle according to the exemplary embodiment of the present disclosure. FIG. 6 shows a transmission lens of the lamp for the vehicle according to the exemplary embodiment of the present disclosure. FIG. 7 schematically shows an optical path of the lamp for the vehicle according to the exemplary embodiment of the present disclosure.

Referring to FIGS. 1 to 4, the lamp for the vehicle according to the exemplary embodiment of the present disclosure may include a light source unit 10, a light guide unit 100, a transmission lens 20, and an outer lens 200. The light source unit 10 may be formed to include a plurality of light sources, and may include at least one first light source 12 for generating first light and at least one second light source 14 for generating second light. In addition, the first light source 12 and the second light source 14 may be formed to generate light having a brightness or a color suitable for the use of the lamp for the vehicle of the present disclosure. An light emitting diode (LED) semiconductor light emitting device may be used as a light source. However, the present disclosure is not limited thereto, and a laser diode (LD) or bulb type lamp may be used as a light source. A halogen lamp or a high intensity discharge (HID) lamp may be used as the bulb type lamp.

The color of the first light and the color of the second light may be formed differently. For example, the first light source 12 may be formed of a white LED that generates the first light in white color, and the second light source 14 may be formed of a red LED that generates the second light in red color. In addition, The light source unit 10 may further include a substrate (not shown), and the at least one first light source 12 and the at least one second light source 14 may be attached to the substrate to generate light in a direction of the light guide unit 100.

The light guide unit 100 may convert the light emitted from a point light source into surface light. For example, in the exemplary embodiment of the present disclosure, the light guide unit 100 may surface-emit by emitting a portion of light incident from one end toward the front of the vehicle.

The light guide unit 100 may be formed of a linear or curvilinear rod elongated in the left and right directions. However, the light guide unit 100 may be implemented in various designs based on the consumer preference and a shape of the vehicle. For example, it may be formed in a curved shape, an arc shape, an annular shape, or the like, and the light guide unit may be bent in a direction from an inboard to an outboard of the vehicle. In addition, the light guide unit 100 according to the exemplary embodiment of the present disclosure may be arranged on both sides of the front or rear of the vehicle, and it may be applied as a signal lamp, a tail lamp, a brake lamp, or the like in some implementations. The light guide unit 100 may be formed of a transparent material such as acrylic resin, urethane acrylate, epoxy acrylate, or the like. Accordingly, the light guide unit 100 may allow the incident light to be emitted to the outside.

As shown in FIG. 5, the light guide unit 100 may include an incident member 110, a reflective optic member 120, and an emission member 130. The incident member 110 may be formed at one end of the light guide unit 100, and light irradiated from the light source unit 10 may be incident on the incident member 110. The incident member 110 may be formed in various shapes. In the drawing, the incident member 110 is illustrated as a circular shape. However, the present disclosure is not limited thereto, and the incident member 110 may be formed in an oval shape, a polygon shape, a square shape, or the like.

In addition, the incident member 110 may include a plurality of incident surfaces, and more specifically, may include a first incident surface 112 on which the first light is incident and a second incident surface 114 on which the second light is incident.

When an incident angle of the first light and the second light with respect to an interface of the light guide unit 100 is less than a critical angle, the light may not be totally reflected within the light guide unit 100, and may be emitted to the outside of the light guide unit 100. Due to the first light and/or the second light emitted to the outside, the light guide unit 100 may provide surface-emission.

However, since the amount of light emitted to the outside is less, the light distribution quality of the light guide unit 100 may become poor. Therefore, the reflective optic member 120 may be formed on a rear surface of the light guide unit 100 to reflect at least a portion of the incident light to the emission member 130. Accordingly, at least a portion of the first light and the second light incident from the incident member 110 may be reflected in a direction of the emission member 130 by the reflective optic member 120.

The emission member 130 may be arranged to face the rear surface of the light guide unit 100. Accordingly, the emission member 130 may correspond to the front of the light guide unit 100. The emission member 130 may emit the first light and the second light reflected from the reflective optic member 120.

The reflective optic member 120 may be formed at least in part along the shape of the light guide unit 100, and the reflective optic member 120 may reflect at least a portion of the first light and/or the second light incident on the incident member 110 of the light guide unit 100 to the emission member 130. Accordingly, the emission member 130 of the light guide unit 100 may emit light incident on the incident member 110 and reflected by the plurality of reflective optic members 120, or the like. Therefore, the reflective optic member 120 may increase the amount of light emitted from the emission member 130 of the light guide unit 100 to the outside.

Therefore, the light guide unit 100 of the present disclosure may be improved in light distribution performance compared with a conventional light guide unit of the related art without the reflective optic member 120. As the light distribution performance is improved, the light distribution performance of the light guide unit 100 of the present disclosure may satisfy the conditions of light distribution regulations.

In addition, as shown in FIG. 5, the reflective optic member 120 may be formed to protrude outward from the rear surface of the light guide unit 100. However, the present disclosure is not limited thereto. For example, although not shown in the drawing, it may be formed by being recessed inward from the rear surface of the light guide unit 100. In addition, in FIG. 5, the light guide unit 100 is described as having only one reflective optic member 120. However, the present disclosure is not limited thereto, and it may be provided in plurality on the rear surface of the light guide unit 100.

As shown in FIG. 4, the transmission lens 20 may be disposed between the first light source and the incident member 110 to change the color of the first light while allowing the first light to be incident and be emitted. Therefore, the transmission lens 20 may be formed in a first color which is a complementary color. Accordingly, the color of the first light may be changed by the transmission lens 20 and be incident on the incident member 110. Here, the first color may be green.

Furthermore, the transmission lens 20 may contact the first incident surface 112 while being disposed between the first light source 12 and the first incident surface 112 to transmit the first light. As a result, the color of the first light may be changed to a shade of green color as it transmits through the transmission lens 20 and may be incident on the first incident surface 112.

Meanwhile, the second incident surface 114 according to the exemplary embodiment of the present disclosure may be formed to protrude from the first incident surface 112 in the direction toward the light source unit 10. Accordingly, as shown in FIG. 6, an incident surface of the transmission lens 20 through which the first light is incident may be disposed on the same plane as the second incident surface 114.

In addition, referring to FIG. 4 again, the transmission lens 20 may be formed larger than the first incident surface for fixing to a bracket provided in the lamp for the vehicle. Therefore, some of the first light incident on the transmission lens 20 may be transmitted in a direction perpendicular to a light traveling direction due to the shape of the transmission lens 20, thereby negatively affecting the light efficiency.

To address this issue, a hole (e.g., a slot) 22 may be formed in the transmission lens 20 to prevent the first light from traveling in the direction perpendicular to the light traveling direction. The hole 22 may be formed in various shapes. For example, the hole 22 may be formed on the transmission lens 20 corresponding to a circumference of the first incident surface 112.

The outer lens 200 may be the first visible portion of the lamp for the vehicle when the lamp for the vehicle of the present disclosure is mounted on the vehicle. In order to transmit at least a portion of the first light and the second light guided by the light guide unit 100, the outer lens 200 may be formed in front of the light guide unit 100 to allow the first light and the second light emitted from the emission member 130 of the light guide unit 100 to be incident and emitted. The outer lens 200 may be formed in a second color. In particular, the second color may be pink. Accordingly, the first light and the second light may be emitted after the color is changed by the outer lens 200.

Referring to FIG. 7, as a result, the first light may be transmitted through the transmission lens 20 and be incident on the first incident surface 112 of the light guide unit 100, be reflected by the reflective optic member 120 to be emitted in a direction from the emission member 130 to the outer lens 200, and be incident on and emitted through the outer lens 200. As the second light is incident on the second incident surface 114 of the light guide unit 100 and is reflected by the reflective optic member 120, the second light may be emitted in a direction from the emission member 130 to the outer lens 200, and be incident on and emitted through the outer lens 200.

In addition, the color of the first light, which is white, may be changed to a shade of green by the transmission lens 20, be incident on and emitted through the light guide unit 100, be transmitted to the outer lens 200, and subsequently be changed to a shade of yellow by the outer lens 200 and be emitted.

The color of the second light may be formed of a shade of red as it is generated from a red LED, be transmitted by the light guide unit 100 to the outer lens 200 and transmitted through the outer lens 200. Therefore, even if the color changes, it may be emitted in the shade of red by the outer lens 200 formed of a pink color.

As a result, the first light may perform a signal function as it transmits through the outer lens 200, and the second light may perform at least one of a tail lamp function or a brake lamp function as it transmits through the outer lens 200. Therefore, the lamp for the vehicle according to the exemplary embodiment of the present disclosure may perform the signal function, the tail lamp function, and/or the brake lamp function through the transmission lens 20, the light guide unit 100, and the outer lens 200.

In the conventional lamp for the vehicle, the outer lens is formed by dividing into a portion that forms a turn signal and a portion that forms the tail-brake lamp. The portion that forms a plurality of turn signals among the outer lenses is formed in a white shade or transparent color, and the portion that forms the tail-brake lamp is formed in a shade of red. In addition, when any one of the above two parts is damaged, either the turn signal function or the tail-brake lamp function cannot be performed.

The outer lens 200 of the present disclosure may be formed in a single second color without distinctive portions. Therefore, as the first light and the second light are transmitted through the same area in the outer lens 200, it is possible to perform the turn signal function and the tail-brake lamp function more efficiently than the lamp of the related art. In addition, even if a portion of the outer lens 200 is damaged, the turn signal and tail-brake lamp functions may be performed by the remaining portions.

Meanwhile, the lamp for the vehicle according to the exemplary embodiment of the present disclosure may further include a control unit (not shown). The control unit may be configured to control the first light source 12 and the second light source 14. In particular, when the first light source 12 and the second light source 14 are illuminated simultaneously, the colors of the first light and the second light may be mixed and irradiated through the outer lens 200. Therefore, in order to more efficiently perform the turn signal function and the tail-brake lamp function, the control unit may be configured to turn off the second light source 14 when the first light source 12 is turned on. Also, when the second light source 14 is turned on, the first light source 12 may be turned off.

In addition, the lamp for the vehicle according to the exemplary embodiment of the present disclosure may further include an inner lens 300. The inner lens 300 may be disposed between the light guide unit 100 and the outer lens 200, and may diffuse at least one of the first light or the second light emitted from the light guide unit 100 in the direction of the outer lens 200. Accordingly, a plurality of optics may be formed in the inner lens 300. Specifically, the plurality of optics may be formed on at least one of an incident surface or an emission surface of the inner lens 300 to diffuse the first light and/or the second light, thereby efficiently forming a uniform lighting image.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific exemplary embodiments disclosed, and that modifications and embodiments are intended to be included within the scope of the appended claims.

What is claimed is:

1. A lamp for a vehicle, comprising:
   a light source unit including at least one first light source for generating first light and at least one second light source for generating second light formed in a color different from a color of the first light;
   a light guide unit for guiding the first light and the second light incident through an incident member thereof;
   a transmission lens disposed between the first light source and the incident member of the light guide unit, through which the first light is incident and emitted, the transmission lens being formed in a first color; and
   an outer lens through which at least a portion of the first light and the second light guided by the light guide unit is transmitted, the outer lens being formed in a second color,
   wherein the color of the first light is changed by the transmission lens and is further changed by the outer lens,
   wherein the incident member comprises:
      a first incident surface on which the first light is incident; and
      a second incident surface on which the second light is incident,
   wherein the transmission lens is formed larger than the first incident surface, and
   wherein the transmission lens includes a hole.

2. The lamp for the vehicle of claim 1, wherein the light guide unit further comprises:
   a reflective optic member formed on at least a portion of a rear surface of the light guide unit, the reflective optic member reflecting at least a portion of the incident first light and second light; and
   an emission member arranged opposite to the rear surface, the emission member emitting light reflected from the reflective optic member.

3. The lamp for the vehicle of claim 1,
   wherein the second incident surface is formed to protrude farther than the first incident surface in a direction toward the light source unit.

4. The lamp for the vehicle of claim 3, wherein an incident surface of the transmission lens is disposed on a same plane as the second incident surface of the light guide unit.

5. The lamp for the vehicle of claim 1, wherein the hole of the transmission lens corresponds to a circumference of the first incident surface of the light guide unit.

6. The lamp for the vehicle of claim 1, wherein the first color of the transmission lens is green.

7. The lamp for the vehicle of claim 1, wherein the second color of the outer lens is pink.

8. The lamp for the vehicle of claim 1, further comprising:
   a control unit for controlling the first light source and the second light source,
   wherein the control unit is configured to turn off the second light source when the first light source is turned on, and to turn off the first light source when the second light source is turned on.

9. The lamp for the vehicle of claim 1, wherein the first light performs a turn signal function as it transmits through the outer lens, and
   wherein the second light performs at least one of a tail lamp function or a brake lamp function as it transmits through the outer lens.

10. The lamp for the vehicle of claim 1, wherein the color of the first light transmitted through the outer lens is formed in a shade of yellow, and
    wherein the color of the second light transmitted through the outer lens is formed in a shade of red.

11. The lamp for the vehicle of claim 1, further comprising:
    an inner lens disposed between the light guide unit and the outer lens,
    wherein the inner lens includes a plurality of optics that diffuse the first light and the second light emitted from the light guide unit in a direction of the outer lens.

12. The lamp for the vehicle of claim 1, wherein the first light source includes a white LED, and the second light source includes a red LED.

* * * * *